UNITED STATES PATENT OFFICE.

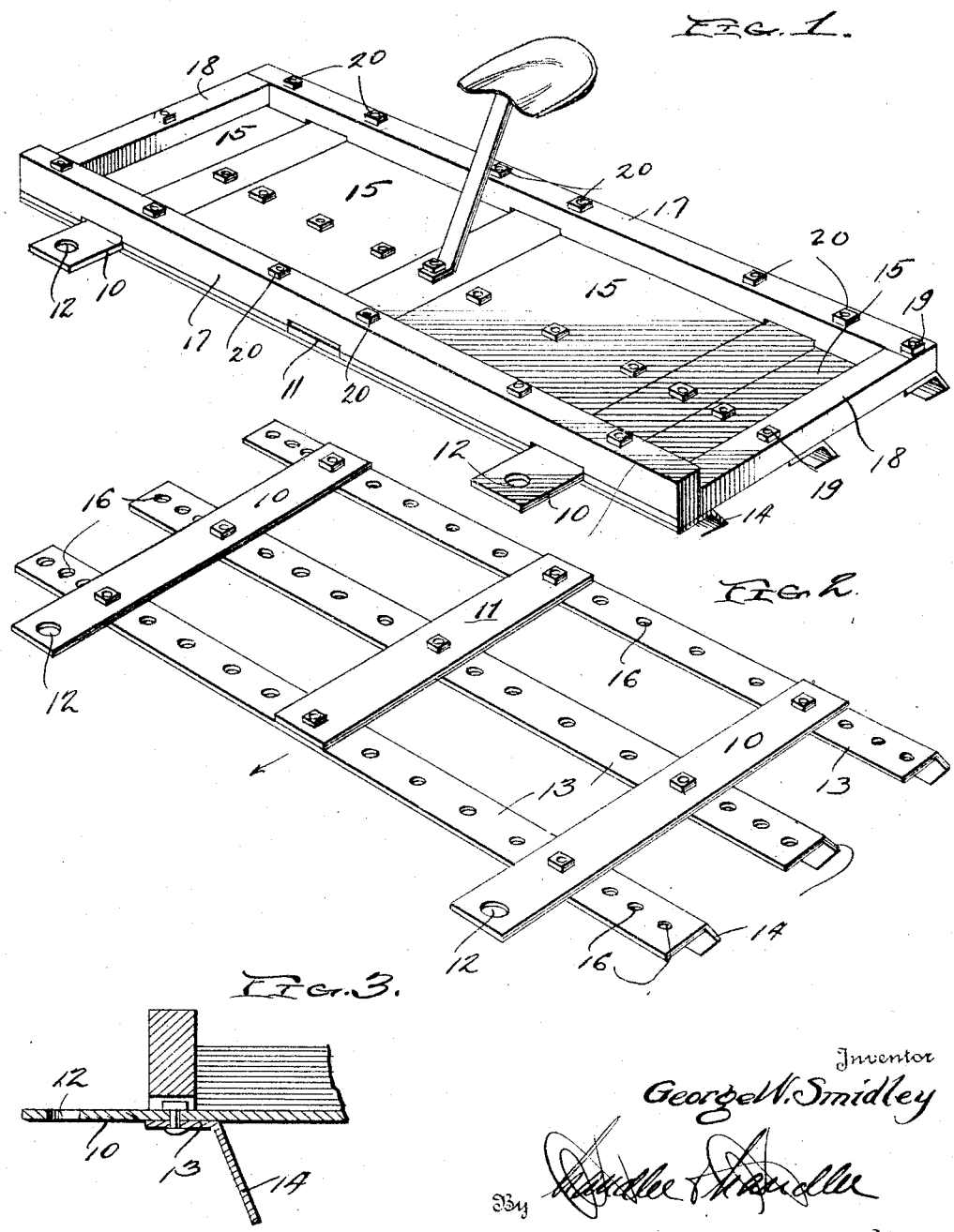

GEORGE W. SMIDLEY, OF NEW HOLLAND, OHIO.

CLOD-CRUSHER AND LEVELER.

1,365,287.   Specification of Letters Patent.   Patented Jan. 11, 1921.

Application filed December 4, 1919. Serial No. 342,334.

*To all whom it may concern:*

Be it known that I, GEORGE W. SMIDLEY, a citizen of the United States, residing at New Holland, in the county of Pickaway, State of Ohio, have invented certain new and useful Improvements in Clod-Crushers and Levelers; and I do hereby declare the following to be a full, clear and exact description of the invention, such as will enable others skilled in the art to which it appertains to make and use the same.

This invention relates to new and useful improvements in agricultural machines and particularly to clod crushers and levelers.

One object of the present invention is to provide a novel and improved device of this character wherein the clod crushing and leveling blades are so arranged that they will not dig into the soil to any greater depth no matter what the added weight is that is applied thereon.

Another object is to provide a novel and improved device of this character wherein there is disposed a removable frame which is arranged to serve as a receptacle, together with the platform of the machine, to hold ballast.

Other objects and advantages will be apparent from the following description when taken in connection with the accompanying drawing:

Figure 1 is a perspective view of the device with the ballast holding frame bolted thereon.

Fig. 2 is a perspective view of the device, the frame being removed.

Fig. 3 is a sectional detail of a portion of the machine showing the position of the clod crushing blade.

Referring particularly to the accompanying drawing 10—10 represent a pair of parallel strips of suitable material and strength, either metal or wood, and extending forwardly and rearwardly of the machine. Disposed centrally between the strips 10 is a similar strip 11, said strip being parallel to the strips 10 but slightly shorter. The forward ends of the strips 10 are provided with openings 12 for engagement of draft means (not shown). The strips 10 and the strip 11 are bolted to the horizontal portions 13 of the obtuse angular metal strips which are disposed below and transversely of the strips 10. The depending portions 14 of these angular strips extend downwardly and rearwardly, as clearly shown in the sectional view Fig. 3 so as to drag along the ground to crush the clods and smooth and level the surface of the ground. Secured on the upper faces of the portions 13 of the angle strips, and between the strips 10 and 11, are the strips 15 of the platform. These strips 15 fit snugly against the side edges of the strips 10 and 11 so as to prevent the upward passage of soil which is drawn between the blades, while the machine is in operation. It will be noted, upon reference to Fig. 2, that the end portions of the angular strips extend beyond the outer sides of the strips 10, and that each of these extensions is formed with bolt openings 16.

A frame, comprising the longer side beams 17 and the shorter end beams 18, which are properly and securely bolted together, is disposed on the top of the structure hereinbefore described. It will be noted that the end strips or beams 18 are disposed on the projecting ends of the scraper blades, and secured thereto by bolts 19 passed through the openings in said ends and the said beams. The longer beams 17 are secured to the ends of the strips 10 and 11 by means of the bolts 20. Thus the frame, formed by the beams 17 and 18 can be removed if desired, and when secured on the machine it, as shown in Fig. 1, will form a receptacle for ballast to hold the machine down while in motion.

The operation of the machine might be likened to that of a wood plane wherein, when the blade is set out to the desired distance, the shaving of wood removed by the blade will be of a certain thickness, and no matter how much weight or pressure is applied to the plane, the blade will not cut any deeper into the wood. Thus the present device is productive of the same result, the blades or strips which include the portions 13 and 14 cutting or scraping into the ground to a certain depth no matter what the weight or pressure applied to the top of the machine. This will result in a smooth and level scraping of the ground and the proper and perfect crushing and pulverizing of the clods, so that the ground will be in a prime condition for planting.

What is claimed is:

1. A clod crusher comprising a frame, longitudinally extending bottom sections therefor, supporting members interposed in the spaces between said bottom members and secured to said frame, and a plurality of spaced clod crushing elements secured to said supporting members transversely thereof.

2. A clod crusher comprising a frame, longitudinally extending bottom sections therefor, arranged in spaced relation, supporting members interposed in the spaces between the bottom sections and secured to said frame, and a plurality of spaced clod crushing elements secured to said supporting members transversely thereof, each of said crushing elements comprising integrally formed and angularly disposed plates, certain of which extend in a downardly and rearwardly inclined direction.

3. A clod crusher comprising a frame, longitudnally extending bottom sections therefor, arranged in spaced relation, supporting members interposed in the spaces between the bottom sections and secured to said frame, and a plurality of spaced clod crushing elements secured to said supporting members transversely thereof, said frame, bottom sections, and supporting members combining to form a platform to prevent upward movement of the soil between the crushing elements.

4. A machine of the class described comprising transversely extending obtuse angular clod crushing strips, longitudinal parallel strips secured to the upper faces of said clod crushing strips, platform members secured to said angular strips between and parallel to the longitudinal strips, the opposite ends of the angular strips extending beyond the outermost parallel strips, and a removable rectangular frame disposed on the machine and bolted to the extending ends of the angular strips and to the ends of the parallel strips and to certain of the angular strips.

In testimony whereof I affix my signature in the presence of two witnesses.

GEORGE W. SMIDLEY.

Witnesses:
W. A. WELCH,
H. CRAWFORD.